July 17, 1934.   L. B. M. BUCHANAN   1,967,019
HEAT EXCHANGE APPARATUS
Filed March 17, 1932
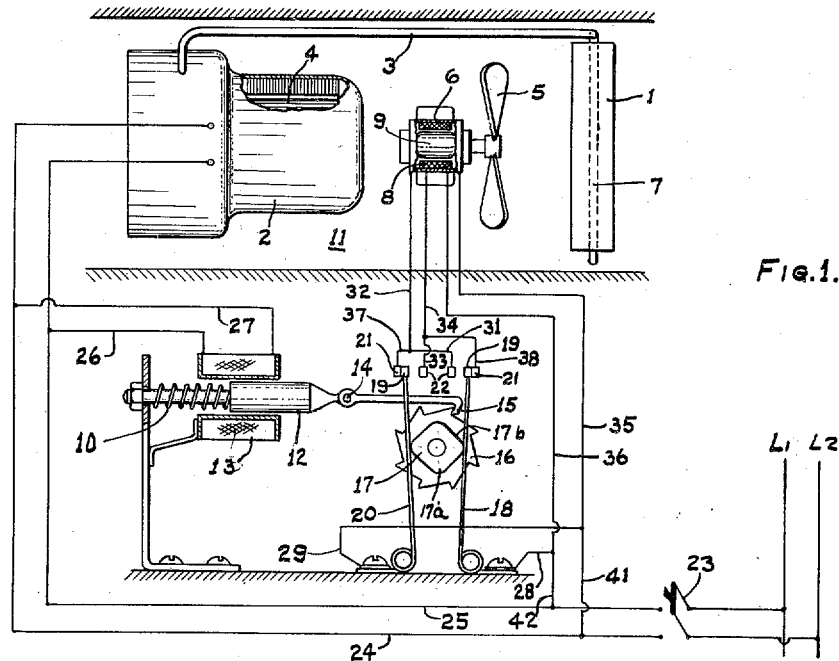
INVENTOR
LESLIE B. M. BUCHANAN
BY
*a. B. Reavis*
ATTORNEY Patented July 17, 1934

1,967,019

UNITED STATES PATENT OFFICE

1,967,019

HEAT EXCHANGE APPARATUS

Leslie B. M. Buchanan, Springfield, Mass., assignor to Westinghouse Electric & Manufacturing Company, a corporation of Pennsylvania Application March 17, 1932, Serial No. 599,534

12 Claims. (Cl. 62—3)

My invention relates to heat exchange apparatus and particularly to heat exchange apparatus containing one body of media in a closed circuit and a second body of media in an open circuit in heat-exchanging relation with the first body of media.

In heat exchangers of the above type in which the body of media in an open circuit sometimes contains dirt, sediment or other foreign matter, parts of the heat exchanger become coated and clogged up thereby. Heat transfer between the two media, therefore, is decreased and is inefficient. I have provided means for preventing coating and clogging of heat-exchange apparatus of this character, by periodically reversing the flow of the open circuit media, whereby the foreign matter lodged on the heat exchanger is dislodged therefrom. The reversing means is preferably operated automatically in response to some correlated condition in the system in which the heat exchanger apparatus is utilized or it may be operated automatically by other well-known control means, so that no care or attention is necessary for maintaining the heat exchanger free from accumulation of foreign matter.

It is accordingly an object of my invention to provide automatic means for periodically removing foreign matter from the open circuit portions of heat exchange apparatus.

It is another object of my invention to provide automatic means operated either mechanically or electrically for reversing the flow of open circuit media in a heat exchanger, which means is preferably responsive to some condition existent in the system in which the heat exchanger is being utilized.

These and other objects are effected by my invention as will be apparent from the following description and claims taken in connection with the accompanying drawing, forming a part of this application, in which:

Fig. 1 is a diagrammatic view of one preferred embodiment of my invention as applied to a small mechanical refrigeration apparatus, wherein electrical means are entirely utilized for reversing the flow of cooling air through the condenser.

Fig. 2 is a diagrammatic view of a second preferred embodiment of my invention as applied to a small mechanical refrigerator, wherein mechanical means are utilized for reversing the flow of air through the condenser.

Although I have shown specific means for reversing the flow of open circuit media in a heat exchanger mechanically and electrically, and applied to a small air-cooled refrigerating machine, I do not wish to be limited thereby except so far as set forth in the appended claims.

Referring now to Fig. 1 for a description of the first preferred embodiment of my invention, numeral 1 designates a condenser which has refrigerant delivered thereto in a closed circuit through the conduit 3, from a compressor (not shown) contained in a motor compressor casing 2. A motor 4 drives the compressor. A fan 5 driven by a motor 6 forces cooling air, or open circuit media, through the condenser 1, thereby cooling the refrigerant contained in the closed circuit thereof, shown at 7. The motor 6 includes a field coil or stator 8 and an armature 9. The entire apparatus is contained in a passageway 11 open at both ends, and the condenser is preferably disposed transversely thereof.

In the first embodiment of my invention, I accomplish reversal of the open circuit fluid, namely, cooling air, by reversing the direction of rotation of the fan motor 6, and therefore of the fan 5, in the following manner: by way of example, the fan motor 6 is shown as an ordinary single phase induction motor having starting and running windings (not shown). The starting winding is provided with a reversible circuit 32 and 34, and the running winding is connected permanently to a line 24, 25 by conductors 35 and 36. When current in the starting winding is changed, the phase relation between starting and running windings is also changed, and the motor will therefore start and run in a direction determined by the instantaneous polarity of the current in conductors 32 and 34 relative to the same instantaneous polarity of the current in conductors 35 and 36.

In order to effect the instantaneous polarity change in conductors 32 and 34, a magneto-mechanical switch is provided including a solenoid winding 13 preferably in shunt with respect to the main circuit 24, 25 supplying the main motor 4, a core 12 and a pawl 15 connected to the core at 14. When the winding 13 is energized through conductors 26, 27, the core 12 is pulled in; and when the winding 13 is deenergized, the core 12 is pushed out by a spring 10. Thus, the pawl 15 is moved alternately in opposite directions, or is reciprocated, and each cycle of motion thereof may be utilized to secure step-by-step operation of mechanism controlling a switch for reversing the fan motor 6. Energization of the winding 13 is effected each time the main motor switch 23 is closed connecting the motor 4 to Line $L_1$, $L_2$.

As shown, the pawl 15 cooperates with a ratchet wheel 16 connected to a cam 17 having alternate high and low portions 17a and 17b, respectively. The cam 17 is disposed between spring contact fingers 18 and 20 which are inherently biased toward each other. The fingers 18 and 20 are connected by conductors 28, 42 and 29, 41 to the main supply line 24, 25. When the fingers are in the outward position contacts 19 thereon engage with contacts 21 to secure operation of the fan 5 in one direction; and in the inward position, the contacts 19 engage with contacts 22 to secure operation of the fan 5 in the other direction.

When the contacts 19 on the spring fingers 18 and 20 engage with the outer contacts 21, current is supplied to the starting winding of the fan motor 6 from supply line 24, conductors 41 and 29, spring finger 20, one set of contacts 19 and 21, and conductors 37 and 32 which connect one of the contacts 21 with the fan motor 6; the circuit returns to the supply line 25 through conductors 34 and 38 connecting the other contact 21 to the fan motor 6, the other set of contacts 21 and 19, spring member 18, and conductors 28 and 42. When the contacts 19 on the spring fingers 18 and 20 engage the contacts 22 and the switch 23 is closed, current is supplied to the starting winding of the fan motor 6 from line 24 through conductors 41, 29 to spring finger 20, through one set of the contacts 19 and 22, and through conductors 33 and 34 to the fan motor 6; and the circuit returns to line 25 through conductors 32 and 31, through the other set of the contacts 22 and 19, spring member 18 and conductors 28 and 42. Since the running windings of the fan motor 6 are permanently connected to the line 24, 25, the fan motor will reverse each time the contacts 19 engage with either of the contacts 21 or 22, whereby the starting winding of the fan motor 6 is affected, and the fan 5 will therefore reverse the direction of air flow through the passageway 11 and the heat exchanger 1.

It is obvious that the periodic reversals of the fan motor 6 may be arranged in any desired manner by changing the shape of the cam 17, and I do not wish to be limited to successive reversals of the fan motor 6 in response to energization of the main motor 4.

Referring now to Fig. 2, for a detailed description of a second embodiment of my invention, a small mechanical refrigeration apparatus is again illustrated contained in a passageway 43 open at both ends. Disposed longitudinally of the passageway is a heat exchanger 44. A fan 45 driven by a motor 46 deriving power from a supply line 74, 75 through conductors 87, 88 drives air or open circuit media through the passageway 43 over the heat exchanger 44, and over a motor compressor casing 47, having contained therein a main motor 48 controlled by a switch 73 between line L3, L4 and supply line 74, 75, to which latter line the motor is connected. A conduit 50 is provided for conveying refrigerant between the motor compressor casing 47 and the heat exchanger 44 which are in closed circuit relation as shown at 60.

Also, disposed in the passageway are two sets of spaced apart movable louvers 49 and 51, disposed transversely of the passageway 43. The heat exchanger 44 is disposed transversely of the louvers 49 and 51 and between them, and longitudinally of the passageway 43, preferably dividing the passageway 43 in half, also dividing the louvers 49 and 51 into sections 49a and 49b, and sections 51a and 51b, respectively. The louvers are so arranged that when the section 49a is open, the opposite section 51a of the louver 51 is closed, and so that when the section 49a of louver 49 is open, the other section 49b of louver 49 is closed. The same is true of louver 51, so that section 49a and 51b are open or closed at the same time, or sections 49b and 51a are open or closed at the same time. Air driven through the passageway by the fan travels preferably from right to left and therefore through section 51b of the louvers 51, upwardly through the heat exchanger 44, and through the section 49a of the louver 49, as shown in Fig. 2 and thence over the motor compressor casing 47. If the louvers are operated to open sections 51a and 49b, and close sections 51b and 49a, air travels through the section 51a of the louver 51, downwardly through the heat exchanger 44, and through the section 49b of the louvers 49. The direction of air flow through the heat exchanger 44 is therefore reversed.

In order to automatically operate the louvers, I provide two coils 52 and 53, having cores 54 and 55 respectively, associated therewith. A rod 56 connects the cores 54 and 55, and bell crank levers 57 and 58, connected to the rod 56 and to the louvers 49 and 51, open or close the louvers when the rod 56 is moved right or left. When the core 55 is drawn into the coil 53 by energization thereof, the louvers are positioned as shown in Fig. 2. If the core 54 is drawn into coil 52, louvers 49b and 51a are opened, and louvers 49a and 51b are closed.

In order to periodically energize one or the other of the coils 52 and 53, a reversing mechanism similar to that shown in Fig. 1 is utilized and includes a solenoid winding 59 preferably in shunt connection through conductors 76, 77 with respect to the main circuit 76, 75 supplying the main motor 48, a core 61 and a pawl 63 connected to the core at 62. When the winding 59 is energized by closing switch 73, the core 61 is pulled in; when the winding 59 is deenergized, the core 61 is pushed out by a spring 72. Thus, the pawl 63 is reciprocated, and each cycle of motion thereof may be utilized to secure operation of different mechanisms.

As shown, the pawl 63 cooperates with a ratchet wheel 64 connected to a cam 65 having alternate high and low portions 65a and 65b, respectively. The cam 65 is disposed between spring contact fingers 66 and 67 which inherently bias toward each other. The fingers 66 and 67 are connection by conductors 78 and 79 to the supply line 74, 75.

When the switch 73 is closed and the fingers are in outward position, contacts 68 thereon contact with contacts 69, and the coil 53 is energized through conductors 81 and 82 extending between contacts 69 and coil 53. The core 55 is therefore pulled to the right, and louvers 49a and 51b are opened, while louvers 51a and 49b are closed. Since air is preferably driven from left to right in the passageway 43 by the fan and fan motor 46 and 45, respectively, air travels upwardly through the condenser 44. When the contacts 68 on the contact fingers 66 and 67 engage with the contacts 71, the coil 52 is energized through conductors 83, 84, thus drawing the core 54 to the left. Therefore, louvers 51a and 49b are opened, and louvers 49a and 51b are closed. In consequence, air travels downwardly through the condenser 44, or in the reverse direction to the former operation.

It is obvious in this embodiment of my invention that, by changing the shape of the cam member 65, the periodic reversals of air flow through the heat exchanger 44 may be varied at will, and I therefore do not wish to be limited to a change of air flow with each successive energization of the main refrigerator motor 48.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination with a refrigerator provided with refrigerant and cooling medium passages placed in heat exchange relation by separating, heat-conductive walls, of means for circulating refrigerant through the refrigerant passage, means for circulating cooling medium through the second passage, and means responsive to energization of the first means effective for controlling the direction of flow of cooling media.

2. In combination with a refrigerator, a heat-exchange apparatus, means for circulating a body of refrigerant in a closed circuit through the apparatus, including a motor, means for circulating a second body of media in an open circuit through the apparatus in heat exchanging relation with the first body, means for providing for periodically reversing the direction of flow of the open circuit media in the apparatus, and means for operating the last-mentioned means in response to energization of the motor.

3. In a refrigerator, a condenser, means for circulating refrigerant through the condenser and including refrigerant compressing means and means for circulating air over the condenser and including means for controlling the direction of air flow.

4. In a refrigerator, a condenser, means for circulating refrigerant through the condenser and including refrigerant compressing means, means for driving the compressing means and means for circulating air over the condenser including means controlling the direction of flow of air in response to energization of the driving means.

5. In a refrigerator, a condenser, means for circulating refrigerant through the condenser including a compressor driven by a motor, a fan for circulating air over the condenser, and reversible driving means for the fan.

6. In a refrigerator, a condenser, means for circulating refrigerant through the condenser including a compressor driven by a motor, a fan for circulating air over the condenser, a reversible motor for driving the fan, and controlling means for the motor responsive to initiation of energization of the compressor motor for securing operation of the fan motor in opposite directions.

7. In a refrigerator, a condenser, means for circulating refrigerant through the condenser including a compressor driven by an electric motor and means for circulating air over the condenser including magnetic means controlling the direction of flow of air either in one direction or the other and responsive to energization of the compressor motor.

8. In a refrigerator, a condenser, means for circulating refrigerant through the condenser including a compressor driven by a motor, a fan for circulating air over the condenser, a reversible electric motor for the fan, and a reversing switch for controlling the direction of rotation of the fan motor and fan.

9. In a refrigerator, a condenser, means for circulating refrigerant through the condenser including a compressor driven by an electric motor, a fan for circulating air over the condenser, a reversible electric motor for driving the fan, a reversing switch for the motor, and means responsive to energization of the compressor motor for operating said switch.

10. In a refrigerator, a condenser, means for circulating refrigerant through the condenser including refrigerant compressing means, a fan for circulating air over the condenser, and mechanical means for reversing the direction of flow of the circulating air responsive to energization of the refrigerant circulating means.

11. In a referigerator, a condenser, means for circulating refrigerant through the condenser, including refrigerant compressing means, and means for driving the compressing means; means for intermittently operating the driving means, means for circulating a cooling medium through the condenser to absorb heat therefrom, means providing for reversal of the direction of flow of the cooling medium through the condenser, and means controlling the last named means in a definite ratio with respect to the energizations of the compressor driving means.

12. In a refrigerator, a condenser, means for circulating refrigerant through the condenser including refrigerant compressing means, and means for driving the compressor; means for circulating cooling media through the condenser in heat exchanging relation therewith, mechanical means for reversing the direction of flow of the cooling media through the condenser and means for operating the mechanical reversing means in response to energizations of said driving means, said latter means including movable louvers for directing the flow of cooling medium through the condenser first in one direction and then in the opposite direction.

LESLIE B. M. BUCHANAN.

DISCLAIMER 1,967,019.—*Leslie B. M. Buchanan*, Springfield, Mass. HEAT EXCHANGE APPARATUS. Patent dated July 17, 1934. Disclaimer filed April 2, 1936, by the assignee, *Westinghouse Electric & Manufacturing Company.*

Hereby enters this disclaimer to claims 3 and 5 of the above patent.

[*Official Gazette April 28, 1936.*]

downwardly through the condenser 44, or in the reverse direction to the former operation.

It is obvious in this embodiment of my invention that, by changing the shape of the cam member 65, the periodic reversals of air flow through the heat exchanger 44 may be varied at will, and I therefore do not wish to be limited to a change of air flow with each successive energization of the main refrigerator motor 48.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination with a refrigerator provided with refrigerant and cooling medium passages placed in heat exchange relation by separating, heat-conductive walls, of means for circulating refrigerant through the refrigerant passage, means for circulating cooling medium through the second passage, and means responsive to energization of the first means effective for controlling the direction of flow of cooling media.

2. In combination with a refrigerator, a heat-exchange apparatus, means for circulating a body of refrigerant in a closed circuit through the apparatus, including a motor, means for circulating a second body of media in an open circuit through the apparatus in heat exchanging relation with the first body, means for providing for periodically reversing the direction of flow of the open circuit media in the apparatus, and means for operating the last-mentioned means in response to energization of the motor.

3. In a refrigerator, a condenser, means for circulating refrigerant through the condenser and including refrigerant compressing means and means for circulating air over the condenser and including means for controlling the direction of air flow.

4. In a refrigerator, a condenser, means for circulating refrigerant through the condenser and including refrigerant compressing means, means for driving the compressing means and means for circulating air over the condenser including means controlling the direction of flow of air in response to energization of the driving means.

5. In a refrigerator, a condenser, means for circulating refrigerant through the condenser including a compressor driven by a motor, a fan for circulating air over the condenser, and reversible driving means for the fan.

6. In a refrigerator, a condenser, means for circulating refrigerant through the condenser including a compressor driven by a motor, a fan for circulating air over the condenser, a reversible motor for driving the fan, and controlling means for the motor responsive to initiation of energization of the compressor motor for securing operation of the fan motor in opposite directions.

7. In a refrigerator, a condenser, means for circulating refrigerant through the condenser including a compressor driven by an electric motor and means for circulating air over the condenser including magnetic means controlling the direction of flow of air either in one direction or the other and responsive to energization of the compressor motor.

8. In a refrigerator, a condenser, means for circulating refrigerant through the condenser including a compressor driven by a motor, a fan for circulating air over the condenser, a reversible electric motor for the fan, and a reversing switch for controlling the direction of rotation of the fan motor and fan.

9. In a refrigerator, a condenser, means for circulating refrigerant through the condenser including a compressor driven by an electric motor, a fan for circulating air over the condenser, a reversible electric motor for driving the fan, a reversing switch for the motor, and means responsive to energization of the compressor motor for operating said switch.

10. In a refrigerator, a condenser, means for circulating refrigerant through the condenser including refrigerant compressing means, a fan for circulating air over the condenser, and mechanical means for reversing the direction of flow of the circulating air responsive to energization of the refrigerant circulating means.

11. In a referigerator, a condenser, means for circulating refrigerant through the condenser, including refrigerant compressing means, and means for driving the compressing means; means for intermittently operating the driving means, means for circulating a cooling medium through the condenser to absorb heat therefrom, means providing for reversal of the direction of flow of the cooling medium through the condenser, and means controlling the last named means in a definite ratio with respect to the energizations of the compressor driving means.

12. In a refrigerator, a condenser, means for circulating refrigerant through the condenser including refrigerant compressing means, and means for driving the compressor; means for circulating cooling media through the condenser in heat exchanging relation therewith, mechanical means for reversing the direction of flow of the cooling media through the condenser and means for operating the mechanical reversing means in response to energizations of said driving means, said latter means including movable louvers for directing the flow of cooling medium through the condenser first in one direction and then in the opposite direction.

LESLIE B. M. BUCHANAN.

DISCLAIMER 1,967,019.—*Leslie B. M. Buchanan*, Springfield, Mass. HEAT EXCHANGE APPARATUS. Patent dated July 17, 1934. Disclaimer filed April 2, 1936, by the assignee, *Westinghouse Electric & Manufacturing Company.*

Hereby enters this disclaimer to claims 3 and 5 of the above patent.

[*Official Gazette April 28, 1936.*]